United States Patent
Berger

(10) Patent No.: US 6,554,017 B2
(45) Date of Patent: Apr. 29, 2003

(54) PRESSURE REGULATING VALVE WITH SECONDARY VENTING MEASURES

(75) Inventor: Rolf Berger, Wolfschlugen (DE)

(73) Assignee: Festo AG & Co., Esslingen (DE)

( * ) Notice: Subject to any disclaimer, the term of this patent is extended or adjusted under 35 U.S.C. 154(b) by 31 days.

(21) Appl. No.: 09/765,245

(22) Filed: Jan. 18, 2001

(65) Prior Publication Data
US 2001/0009161 A1 Jul. 26, 2001

(30) Foreign Application Priority Data
Jan. 22, 2000 (DE) .......................... 100 02 752

(51) Int. Cl.⁷ .............................................. G05D 16/02
(52) U.S. Cl. ..................... 137/116.5; 137/115.13; 137/489; 137/505.11
(58) Field of Search .................. 137/115.13, 116.5, 137/489, 505.11

(56) References Cited

U.S. PATENT DOCUMENTS

| 3,064,670 A | * 11/1962 | Peras ....................... 137/116.5 |
| 3,545,471 A | 12/1970 | Taplin |
| 3,926,204 A | 12/1975 | Earl |
| 3,926,208 A | * 12/1975 | Hoffman ................... 137/116.5 |
| 4,966,183 A | * 10/1990 | Williamson, Jr. ........... 137/489 |
| 5,092,358 A | * 3/1992 | Andres et al. ............ 137/116.5 |
| 5,586,569 A | * 12/1996 | Hanning et al. .......... 137/116.5 |
| 5,924,443 A | * 7/1999 | Wohlfahrt ................ 137/116.5 |
| 5,931,182 A | * 8/1999 | Craft et al. .............. 137/116.5 |
| 6,068,014 A | * 5/2000 | Tomita ..................... 137/116.5 |

FOREIGN PATENT DOCUMENTS

| DE | 24 57 371 A | 6/1975 |
| DE | 295 12 498 U | 12/1995 |
| GB | 2 099 112 | 12/1982 |

OTHER PUBLICATIONS

Search report from EPO for the application EP 00 12 5729 (Sep. 2002).

* cited by examiner

Primary Examiner—Michael Powell Buiz
Assistant Examiner—Ramesh Krishnamurthy
(74) Attorney, Agent, or Firm—Hoffmann & Baron, LLP

(57) ABSTRACT

A pressure regulating valve having secondary venting measures. It comprises a control member for the control of the fluid connection between a primary duct and a secondary duct. The position of the control member is able to be influenced by a venting aperture also under the control of the control member and serving for venting the secondary duct. The venting opening is so arranged on the setting member that it is located outside the comparison chamber and in this respect either directly in the secondary duct or in a region in communication with the secondary duct.

10 Claims, 1 Drawing Sheet

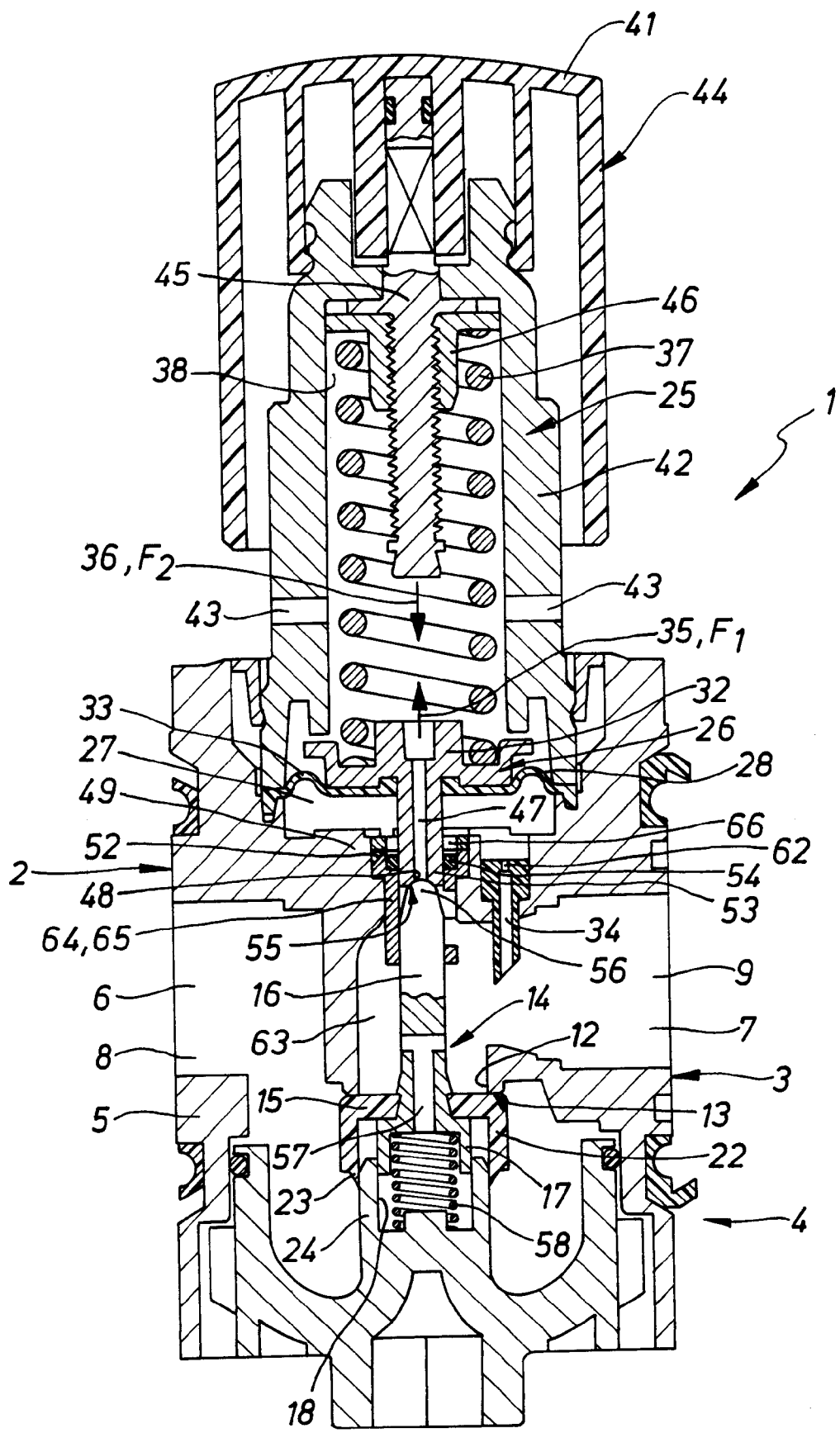

PRESSURE REGULATING VALVE WITH SECONDARY VENTING MEASURES

BACKGROUND OF THE INVENTION

The invention relates to a pressure regulating valve having secondary venting measures, comprising a primary duct subject to a primary pressure, a secondary duct rendering possible tapping of a regulated secondary pressure and a movable control member serving for control of the fluid connection between the primary and the secondary duct, the position of said control member being able to be influenced by a moving setting member able to be subjected to an adjustable presetting force, said setting member being constituted by a movable wall section of a comparison chamber communicating with the secondary duct and said setting member furthermore having a venting opening, also under the control of the control member and serving for venting the secondary duct.

THE PRIOR ART

A pressure regulating valve of this type is disclosed in "Der Pneumatic-Katalog 98" pages 9.3/12-1. It is utilized more particularly in connection with compressed air handling in compressed air supply networks, it being employed to hold constant the working pressure, available on the secondary side, in a manner substantially independent of variations in pressure on the secondary side. The secondary venting measures here make possible a reduction of the secondary pressure available in the secondary duct, for instance for venting the connected piping or in the case of pressure increases on the secondary side owing to operation of the driven loads.

In the case of known pressure regulating valves there are substantial oscillation problems owing to variations in the secondary pressure. With an increase in the rate of flow or, respectively, a higher utilized flow of the regulator the tendency to oscillation will increase. For reducing the oscillations it is consequently necessary to make the technical performance data of the pressure regulators, and more particularly the maximum achievable flow rates, less than would be otherwise technically possible.

SHORT SUMMARY OF THE INVENTION

Accordingly one object of the present invention is to provide a pressure regulating valve with a reduced tendency to oscillation.

In order to achieve these and/or other objects appearing from the present specification, claims and drawings, in accordance with claim 1 herein there is the feature that the venting opening is so arranged on the setting member that it is located outside the comparison chamber either directly in the secondary duct or in a region in communication with the secondary duct.

In the prior art the venting opening provided on the setting member is in the interior of the comparison chamber communicating with the secondary duct via a connecting duct. The vented flow occurring with the venting opening open is therefore from the secondary duct through the communicating duct into the comparison chamber and from same by way of the venting opening to the outside. Owing to the limited cross section of the communicating duct, which can be termed an interrogating duct, the pressure obtaining in the comparison chamber falls more rapidly and to a greater extent during venting than the secondary pressure in the secondary duct. This leads to a overshoot of the regulator or, respectively, of the regulating circuit and oscillation of the regulator will occur. Although such tendency to oscillate may be countered by reduction of the size of the venting opening and also by reduction of the cross section of the connecting duct (i. e. physical damping), this will be at the expense of the response behavior of the pressure regulating valve, the excess pressure coming from the fluid distribution network, connected on the secondary side, being able to be reduced less rapidly. In the case of the design of the invention the venting opening responsible for secondary venting is now no longer in the comparison chamber and is located either directly in the secondary duct or in a region which is connected with the secondary duct, for instance in an additional chamber in communication with the secondary duct by way of a large cross section. The pressure available on the secondary side is now still in the comparison chamber and supplies the force opposing the presetting force, which can be set from the outside and with which the secondary pressure to be regulated may be preset. However the vented secondary flow does not pass through the comparison chamber and the connecting duct preceding it, but bypasses the comparison chamber and escapes by way of the venting opening placed outside it. The interfering influence of secondary venting therefore no longer acts on the setting member, something involving the further advantage that the cross section of any connecting duct present may be reduced so that a physical damping of the regulating circuit will take place. An additional advantage will be that the caliber of the venting opening may be increased so that the secondary venting performance is increased. The tendency of the regulator to oscillate is reduced to such an extent that in operation it will oscillate less or not at all and the regulator may be designed and operated for and, respectively, with substantially larger flow performances.

Further advantageous developments of the invention will appear from the claims.

The control member preferably extends in a control chamber designed as component of the secondary duct, the venting opening being within this control chamber. If the control member is in the form of a plunger, the control chamber can also be termed a plunger chamber.

A particularly advantageous design in accordance with the invention is such that the setting member extends in a sealed manner through a housing wall separating the comparison chamber from the secondary duct and has a head section with the venting opening, said head section extending into the secondary duct. Here it is possible for the head section of the setting member to cooperate with a terminal secondary control section of the control member.

Since the control member, unlike the prior art designs, no longer extends through a partition separating the primary duct from the comparison chamber, and instead conveniently terminates within the secondary duct, its terminal section is preferably provided with a guide member placed in the secondary duct and fixed in relation to the housing. This guide means may comprise a guide insert anchored in the above mentioned partition and extending into the secondary duct.

The comparison chamber is preferably connected by way of at least one connecting duct with the secondary duct. This connecting duct can be termed an interrogation duct, because it samples the pressure obtaining in the secondary duct and passes on the information to the comparison chamber.

The connecting duct preferably has a relatively small cross section something which is preferably ensured by providing a suitable choke means. The maximum venting cross section associated with the venting opening may be made larger than the cross section of the connecting duct.

The setting member functioning as a moving wall section of the comparison chamber may be piston-and/or diaphragm-like. It is preferred for it to possess a principal body containing the venting opening and fixed to the housing in a sealing manner by means of a preferably at least partially rubber-elastically deformable diaphragm. This renders possible a setting movement with very little friction.

Further advantageous developments and convenient forms of the pressure regulating valve will be understood from the following detailed descriptive disclosure of one embodiment thereof in conjunction with the accompanying drawing showing a longitudinal section in a single figure.

The drawing shows in longitudinal section a pressure regulating valve generally referenced 1, which could also be termed a pressure regulator. In the present case it is in the form of a so-called servicing device, which is employed for the production or conditioning of compressed air in supply systems and possesses interfaces 2 and 3 preferably arranged on opposite side thereof and serving for the connection of pressure medium lines leading to further equipment or further types of servicing devices.

The pressure regulating valve 1 possesses a housing 4 with a principal housing body 5, in which fluid ducts termed the primary duct 6 and the secondary duct 7 run. These two ducts respectively open at one end at the interfaces 2 and 3 with the formation of a primary connection 8 and a secondary connection 9 on the outer side of the housing. During operation of the pressure regulating valve 1 compressed air at the primary pressure may be supplied by way of the primary connection 8. Compressed air at a secondary pressure may be tapped at the secondary connection 9 and may be passed on to one or more loads, the secondary pressure as a rule being less than the primary pressure and being able to be set using the pressure regulating valve as needed. The primary and the secondary duct 6 and 7 are connected with one another by way of a transfer opening 12, which is surrounded by a primary valve seat 13. The fluid connection produced by the transfer opening 12 between the primary and the secondary ducts 6 and 7 is controlled by shifting control member 14, which has a primary control section 15 and is able to be moved in relation to the primary valve seat 13 into a closed position or into different open positions. The control member 14 accordingly possesses a continuous control characteristic, the primary control section 15 being in sealing engagement with the primary valve seat 13 in the closing position and so separates the primary duct 6 from the secondary duct 7, whereas in the open positions there is a smaller or larger distance between the primary control section 15 and the primary valve seat 13, which provides a greater or smaller transfer cross section between the primary duct 6 and the secondary duct 7 for the compressed air or some other fluid pressure medium.

The control member 14 is designed like a plunger in the working example and possesses an elongated plunger body 16, whose rear terminal part 17 runs in a recess 18 in the housing. The primary control section 15 is preferably a part of a pot-like sealing body 22, which (with the opening located at the back side of the plunger body 16) is fixed on the plunger body 16, facing the floor face, the front side of the plunger body 16 of the sealing body 22 constituting the primary control section 15. The surrounding edge, facing away from the floor, of the sealing body 22 is best provided with a sealing lip 23, which surrounds a cylindrical housing projection 24 in a sliding manner with sealing contact, such housing projection 24 containing the housing recess 18. The sealing lip 23 preferably has a check valve function so that, given a suitable pressure differential, it permits fluid flow from the secondary duct 7 to the primary duct 6 and prevents flow in the opposite direction.

The pressure regulating valve 1 renders possible a substantially constant regulation of the primary pressure to be at a desired gage pressure value below the primary pressure. The desired secondary pressure may be set by a presetting means 25 at various different values. The presetting means 25 comprises a setting member 26 arranged in a moving manner in the interior of the housing 4, and defining a fluid chamber, termed the comparison chamber 27, it forming a moving wall section of such comparison chamber 27. The remaining wall sections of the comparison chamber 27 are constituted by the housing 4 so that the volume of the comparison chamber 27 is dependent on the instantaneous position of the setting member 26.

The setting member 26 could be made like a piston to ensure a sealing action between it and the housing 4 and, using a suitable piston seal, be guided for sliding movement in the housing. In the working example a diaphragm seal 28 is however employed because of lower friction, said diaphragm being free of sliding friction. Specifically, the setting member 26 possesses a rigid principal body 32, which is connected with the housing 4 by way of a diaphragm 33 manufactured of a material with rubber-elastic properties.

The comparison chamber 27 communicates by way of at least one connecting duct 34 constantly with the secondary duct 7. It is in this manner that the comparison chamber 27 is always filled with fluid, the pressure obtaining in the comparison chamber 27 normally being equal to the secondary pressure. The connecting duct 34 can accordingly also be termed an interrogation duct, which interrogates the pressure obtaining in the secondary duct 7 and transmits it to the comparison chamber 27.

Owing to the comparison pressure in the comparison chamber 27 the setting member 26 is constantly urged in an opening direction 35 as indicated by the arrow. The resulting opening force $F_1$ is in a closing direction 36 opposed by a closing force, termed the presetting force $F_2$, such closing force being produced by a spring means 37 whose biasing action is able to be set.

The spring means 37, which is preferably constituted by a helical compression spring, extends in the working example in a spring chamber 38 delimited by the housing 4, such chamber being formed preferably in an elongated covering plate 42 mounted on the principal body 5 of the housing and resembling a hollow body. Via one or more outlet ducts 43 extending through the housing 4, the spring chamber 28 is constantly connected with the outside or atmosphere so that it is at atmospheric pressure.

For setting the presetting force $F_2$ the presetting means 25 comprises a setting means 44. In the working embodiment illustrated same comprises a rotary head 41 mounted in a rotatable manner on the covering plate 42 and which is connected with a lead screw 45 in a rotation transmitting manner, said screw being in screw threaded connection with a loading disk 46 arranged in the spring chamber 38. The loading disk 46 is not able to be rotated in relation to the housing 4 but is able to be slid in the longitudinal direction of the spring chamber 38 so that its axial position may be set by turning the rotary head 44. It acts on the outer end of the spring means 37 whose inner end thrusts against the setting member 26 in the closing direction 36. It will be clear that by changing the position of the loading disk 46 the bias of the spring means 37 and accordingly the presetting force $F_2$ may now be varied.

The presetting force $F_2$ could additionally or alternatively to the mechanical preset means present in the working example also be caused by fluid force or by electromagnetic proportional magnets.

The setting member 26 has at least one venting duct 47 extending through it, whose outer end is in constant communication with the atmosphere, this best being ensured by its communicating with the spring chamber 38, which is connected with the above mentioned outlet ducts 43.

The opposite inner end of the venting duct 47 constitutes a venting opening 48, which like the transfer opening 12 is also under the control of the control member 14. The cooperation together of the setting member 26 and the control member 14 hence means that there is an influence on opening and closing of the venting opening 48.

In the preferred, convenient working embodiment illustrated the setting member 26 extends from the comparison chamber 27 into the secondary duct 7, it sliding in an opening in a housing wall in a sealing manner, such wall being in the following termed a partition 49, which separates the comparison chamber 27 from the secondary duct 7. The setting member has its head section 53 (which at its end has the venting opening 48) extending into the secondary duct 7 in such a manner that the venting opening is located outside the comparison chamber 27 at all times within the secondary duct 7, irrespectively of the instantaneous position of the setting member 26.

In the actual embodiment of the invention the head section 53 is formed by the end of a plunger-like portion of the principal body 32, which has the venting duct 47 extending through it.

For providing a seal with respect to the housing a sealing ring 54 is for example employed, which is located in place in an aperture 52, through which the setting member 26 runs, and makes sealing engagement with the outer periphery of the setting member 26 able to be slid in relation thereto.

The venting opening 48 of the setting member 26 is surrounded and defined by a secondary valve seat 55 able to cooperate with a secondary control section 56, which is provided on the front end of the control member 14. If the secondary control section 56 contacts the secondary valve seat 55, the venting opening 48 will be closed. If on the other hand the secondary valve seat 55 assumes a position spaced from the secondary control section 56, the venting opening 48 will be open, this meaning that there is a connection between the secondary duct 7 and the atmosphere so that pressure medium held in the secondary duct 7 may make its way through the venting duct 47, the spring chamber 38 and the outlet ducts 43 into the atmosphere. This at the same time leads to a reduction in the secondary pressure.

The manner of functioning of the pressure regulating valve is as follows:

Starting with a secondary pressure in the secondary duct 7 which is less than the desired secondary pressure, the control member 14 is shifted by the setting member 26 into an open position. This is because the presetting force $F_2$ at this time is still larger than the opening force $F_1$ set by the instantaneous secondary pressure obtaining. Owing to this the setting member 26 is shifted by way of the spring means 37 toward the control member 14, its shifting the member 14 out of a closed position into an open position. Since the control member 14 is then constantly in engagement with the secondary valve seat 55, the venting opening 48 will remain closed.

In order not to interfere with the movement of the control member 14, the housing recess 18 is connected by at least one duct 57, preferably arranged in the plunger body 16, constantly with the secondary duct 7.

By way of the transfer opening 12, which is now free, compressed air will flow from the primary duct 6 into the secondary duct 7 so that the secondary pressure is increased and accordingly with it the opening force $F_1$, also dependent on the secondary pressure. Therefore the setting member 26 will gradually shift into the opening direction, the corresponding motion being simultaneously performed by the control member 14, such motion being more especially caused by a setting spring 58 acting on the setting member 26 and preferably accommodated in the housing recess 18.

When ultimately the secondary pressure has reached the desired value, a condition of force equilibrium will become established between the opening force $F_1$ and the presetting force $F_2$, something which results in there being a predetermined setting of the setting member 26, in which the control member 14 will assume the closed position in relation to the transfer opening 12.

If the secondary pressure should drop further, the control member 14 is again shifted by the setting member 26 in the opening direction so that the pressure medium may flow from the primary duct 6 to make good the deficit.

If on the contrary the secondary pressure should climb above the desired value, the setting member 26 will, owing to the opening force $F_1$, which is larger than the presetting force $F_2$, move farther in the opening direction, its secondary valve seat 55 being lifted clear of the secondary control section 56, because the control member 14 is prevented from moving farther owing to reaching its closed position. This means that the venting opening 48 is opened so that pressure medium may make its way directly from the secondary duct 7 by way of the venting opening 48 and the venting duct 47 of the setting member 26 into the atmosphere, this being accompanied by a reduction in the secondary pressure. Owing to the opening force $F_1$ then being reduced, the setting member 26 will gain shift in the closing direction 36 until it engages the control member 14, this meaning that the venting opening 48 is sealed off.

During the secondary venting procedure just described there is the advantage that the venting operation does not now interfere with the setting member 26 functioning as a comparison means between the opening force resulting from the secondary pressure and the presetting force. The venting flow does not take place through the comparison chamber 27 so that the tendency to oscillate is substantially reduced. The cross section of the connecting duct 34 may be made extremely small so that physical damping of the regulating circuit is established without disadvantages as regards the compressed air escape rate possible during secondary venting. On the contrary, the secondary venting performance of the venting cross section associated with the venting opening may be increased.

In the working embodiment a cross section of the connecting duct substantially smaller than the venting cross section is achieved because a choke 62 is provided in the connecting duct 34.

The venting opening 48 arranged clear of the comparison chamber 27 does not have to be located directly in the secondary duct 7 as in the working example and may, for example, in fact be provided in an additional chamber at the aperture 52 clear of the comparison chamber 27.

In the working embodiment illustrated the control member 14 runs in a section, termed the control chamber 64, of the secondary duct 7, preferably as a coaxial extension of the transfer opening 12.

In order to ensure exact control motion of the control member 14, same has its terminal section (associated with the venting opening 48) bearing transversely against a guide means 64 on the housing within the secondary duct 7 and in the present case within the control chamber 63 and it is guided for sliding in the longitudinal direction. The guiding means here preferably possesses a guide insert 65, which is anchored in the aperture 52 in the partition 49, whence it extends into the secondary duct 7, it at least partially surrounding the terminal section of the control member 14. A securing element 66 is provided to fix the guiding insert 65 and the sealing ring 54 simultaneously.

What is claimed is:

1. A pressure regulating valve having secondary venting measures, comprising a primary duct subject to a primary pressure, a secondary duct rendering possible tapping of a regulated secondary pressure and a movable control member serving for control of a fluid flow between the primary and the secondary duct, movement of said control member being influenced by a moving setting member able to be subjected to an adjustable presetting force, said setting member being constituted by a movable wall section of a comparison chamber communicating with the secondary duct and said setting member furthermore having a venting opening, also under the control of the control member and serving for venting the secondary duct, wherein the venting opening is so arranged that it is located on the setting member outside the comparison chamber either directly in the secondary duct or in a region in communication with the secondary duct, and wherein the control member has a terminal section associated with the venting opening, said terminal section being guided within the secondary duct by a guide means secured to the housing, said guide means comprising a guide, insert anchored in a housing wall dividing the comparison chamber and the secondary duct from one another and extending into the secondary duct.

2. The pressure regulating valve as set forth in claim 1, wherein the control member runs in a control chamber designed in the form of part of the secondary duct, the venting opening being within such control chamber.

3. The pressure regulating valve as set forth in claim 1, wherein the setting member extends in a sealed fashion through a housing wall located between the comparison chamber and the secondary duct and preferably has a head section thereof protruding into the secondary duct, said head section having said venting opening.

4. The pressure regulating valve as set forth in claim 3, wherein the head section of the setting member in the secondary duct cooperates with a terminal secondary control section:of the control member.

5. The pressure regulating valve as set forth in claim 1, wherein the comparison chamber is connected by way of at least one connecting duct with the secondary duct.

6. The pressure regulating valve as set forth in claim 5, wherein the venting cross section of the venting opening is larger than the cross section of the at least one connecting duct.

7. The pressure regulating valve as set forth in claim 5, wherein the connecting duct is provided with a choke means.

8. The pressure regulating valve as set forth in claim 1, wherein said control member includes an elongated plunger body.

9. The pressure regulating valve as set forth in claim 1, comprising a diaphragm seal acting between the setting member and the housing.

10. The pressure regulating valve as set forth in claim 1, wherein the setting member possesses a principal body having the venting opening therein and which is secured by a diaphragm to the housing with a sealing effect.

* * * * *

UNITED STATES PATENT AND TRADEMARK OFFICE
CERTIFICATE OF CORRECTION

PATENT NO.    : 6,554,017 B2
DATED         : April 29, 2003
INVENTOR(S)   : Rolf Berger It is certified that error appears in the above-identified patent and that said Letters Patent is hereby corrected as shown below:

Column 8,
Line 4, now reads "section:of" should read -- section of --
Line 40, now reads "will gain shift" should read -- will again shift --

Signed and Sealed this

Seventh Day of October, 2003

JAMES E. ROGAN
*Director of the United States Patent and Trademark Office*